Patented Jan. 2, 1923.

1,440,833

UNITED STATES PATENT OFFICE.

GEORG KALISCHER, OF MAINKUR, NEAR FRANKFORT-ON-THE-MAIN, AND JENS MÜLLER AND DETLEV NISSEN, OF FRANKFORT-ON-THE-MAIN, GERMANY, ASSIGNORS TO LEOPOLD CASSELLA & CO. GESELLSCHAFT MIT BESCHRÄNKTER HAFTUNG, A CORPORATION OF GERMANY.

YELLOW VAT DYESTUFF.

No Drawing.   Application filed December 31, 1921.   Serial No. 526,270.

*To all whom it may concern:*

Be it known that we, GEORG KALISCHER, residing at Waldstrasse 23, Mainkur, near Frankfort-on-the-Main, JENS MÜLLER, residing at Hanau, Akademiestrasse 40, and DETLEV NISSEN, residing at Habsburger Allee 66, Frankfort-on-the-Main, all citizens of the German Empire, have invented certain new Yellow Vat Dyestuffs, of which invention the following is a full description.

We have found that very valuable yellow vat dyestuffs are obtained by heating to elevated temperatures 2-methylanthraquinone with sulfur and such aromatic compounds which contain in their molecule the paradiamine-nucleus:

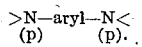

The paradiamines themselves as benzidine, p-phenylenediamine and its substitution products are particularly well suited for the reaction. Furthermore such compounds may be applied with the same success which like nitro- or azo-compounds yield intermediarily during the reaction paradiamines as for instance p-nitraniline, p-aminoazobenzene.

The fact that the characters of the paradiamine compound employed substantially affects the character of the resulting dyestuff, proves that the paradiamine enters into the molecule of the dyestuff.

The quantities of the paradiamines or respectively of the compounds containing the group:

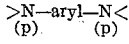

may be varied considerably, but the proportion of 2 molecules 2-methylanthraquinone to 1 molecule paradiamine has proved to be particularly advantageous.

The new dyestuffs obtained according to this process are insoluble in water and in most organic solvent agents. With alkaline hydrosulfites they yield olive to brown colored vats, from which vegetable fibres are dyed greenish to reddish-yellow shades. Thus the dyestuff produced from 2-methylanthraquinone and benzidine yields full reddish-yellow shades, while the dyestuff obtained with p-nitraniline or p-phenylenediamine yields pure yellow shades.

The dyeing produced with the new dyestuffs possesses excellent properties of fastness to washing, to acids, to chlorine and to light. The new dyestuffs are distinguished from those obtained by heating 2-methylanthraquinone with sulfur alone by their different chemical behaviour and also by their superior tinctorial properties.

The process is illustrated by the following examples:

*Example 1.*—A mixture of 22.2 kilos 2-methylanthraquinone and 9.2 kilos benzidine are introduced whilst stirring into 100 kilos melted sulfur at a temperature of about 200° C. The melt is hereupon heated within 4 hours to a temperature of about 230° C. and is then kept for further 10 hours at about 230–240° C. It is then allowed to cool down, powdered and in order to free it from the excess of sulfur for instance digested with a solution of sodium sulfide. The dyestuff thus obtained still contains brown coloring by-products. In order to remove them the dyestuff is dissolved in about 10 parts concentrated sulfuric acid by heating it for several hours to 100–120° C. The solution thus obtained is thereupon precipitated with water, whereby it is obtained in a finely divided state. This paste is then treated at 60–100° C. with oxydation agents, as for instance with a solution of sodium hypochlorite until the impurities have been removed and a test dyeing yields a pure yellow shade.

The dyestuff in a pure state is an orange colored powder, soluble in concentrated sulfuric acid with an orange yellow color. In most of the organic solvent agents the dyestuff is difficultly soluble. From the brownish olive colored vat cotton is dyed reddish yellow shades.

*Example 2.*—A mixture of 22 kilos 2-methylanthraquinone and 6.9 kilos p-nitraniline are slowly added to 100 kilos melted sulfur at about 240° C., the melt is thereupon heated during 5 hours to about the same temperature. It is allowed to cool, ground and thereupon worked in the same manner as described in example 1. The pure dyestuff represents a brownish yellow colored powder, soluble in concentrated sulfuric acid with a brown orange color and yielding with alkaline hydrosulfites a brown colored vat. On vegetable fibres greenish yellow shades are obtained, which are fast to washing, chlorine and light.

When using instead of p-nitraniline the equivalent quantity of p-phenylenediamine or p-amidoazobenzene, working otherwise as described above, the same yellow colors are obtained. Analogous dyestuffs are obtained when applying substitution products of p-diamines as for instance chloro-p-nitraniline and chloro-p-phenylenediamine.

Having now particularly described and ascertained the nature of our said invention, and in what manner the same is to be performed, we declare that what we claim is:

1. Process of producing yellow vat dyestuffs, which consists in heating to temperatures above 200° C. 2-methylanthraquinone with sulfur and such aromatic compounds which contain the paradiamine-nucleus:

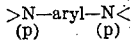

in their molecule, and purifying the products thus obtained by treating them with oxydation agents, substantially as described.

2. Process of producing yellow vat dyestuffs, which consists in heating to temperatures above 200° C. 2-methylanthraquinone with sulfur and such aromatic compounds which contain the paradiamine-nucleus:

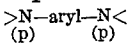

in their molecule, substantially as described.

3. As new products the dyestuffs obtained by heating to elevated temperatures 2-methylanthraquinone with sulfur and such aromatic compounds which contain a paradiamine-nucleus:

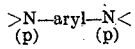

in their molecule and purifying the products thus obtained by treating them with oxydation agents, substantially as described. The dyestuffs thus obtained are insoluble in water and in most organic solvent agents. They dissolve in concentrated sulfuric acid with a yellowish to brownish color. With alkaline hydrosulfites they yield olive to brown colored vats, from which vegetable fibres are dyed in greenish to reddish yellow shades, fast to washing, chlorine and light, substantially as described.

In witness whereof we have hereunto signed our names this twelfth day of December, 1921.

Dr. GEORG KALISCHER.
Dr. JENS MÜLLER.
Dr. D. NISSEN.

Witnesses:
THOMAS N. ANDERSON,
FRAU LOVITSKY.